UNITED STATES PATENT OFFICE.

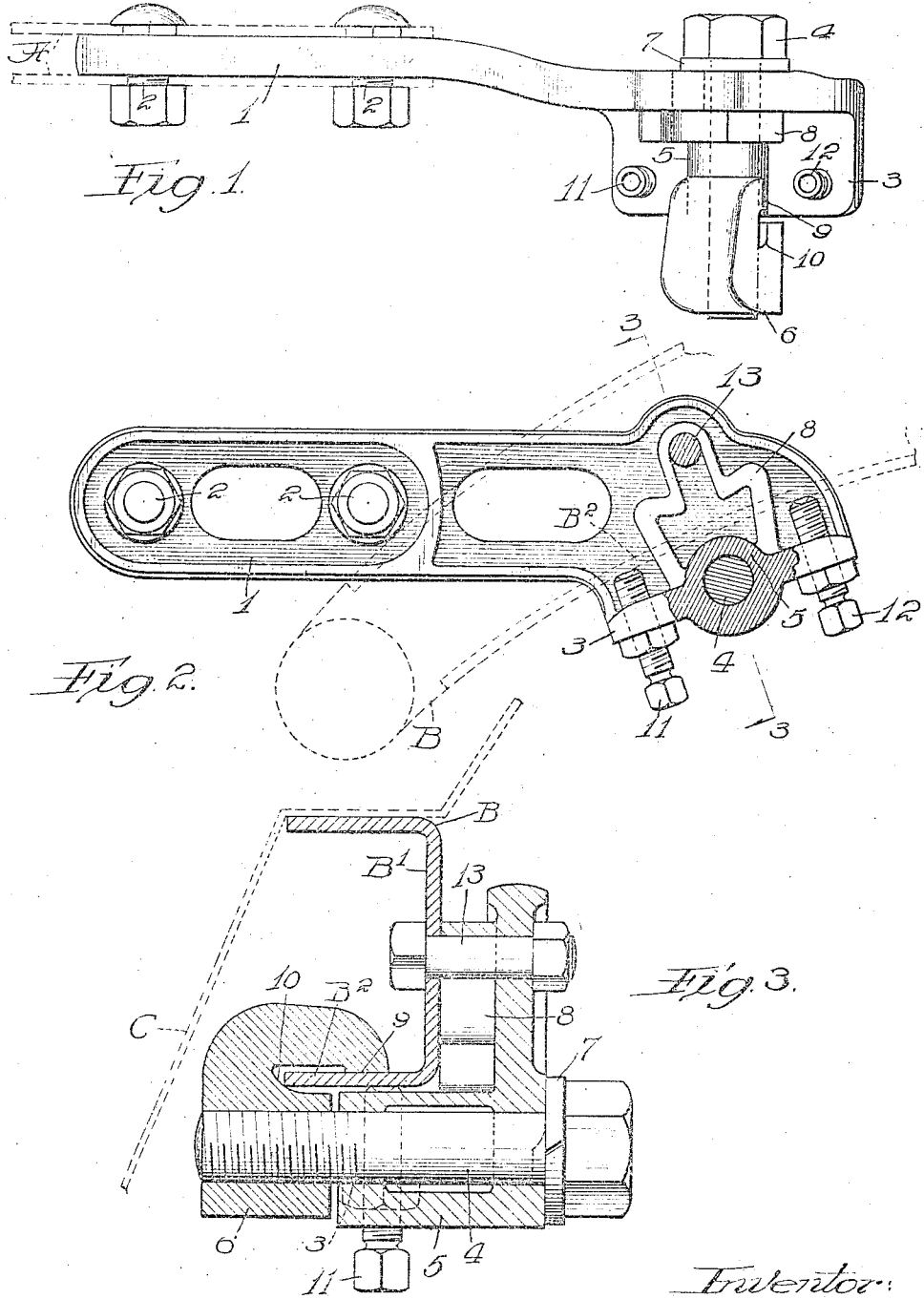

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

BUMPER BRACKET AND CLAMP.

1,294,381. Specification of Letters Patent. Patented Feb. 18, 1919.

Application filed November 10, 1917. Serial No. 201,218.

*To all whom it may concern:*

Be it known that I, JOSEPH BERG, a citizen of the United States, residing at Chicago, in the county of Cook and the State of Illinois, have invented certain new and useful Improvements in Bumper Brackets and Clamps, of which the following is a specification, reference being had to the accompanying drawings forming a part thereof.

The purpose of this invention is to provide means for attaching a bumper bar to an automobile frame by a minimum use of tools or work on the automobile frame itself. It consists in the features and elements hereinafter described and shown in the drawings as indicated by the claims.

In the drawings:

Figure 1 is a bottom plan view of a bracket and clamp embodying this invention.

Fig. 2 is a side elevation partly in section with a portion of an automobile frame member added in dotted outline to indicate the manner of attachment of the bracket.

Fig. 3 is a transverse vertical section taken as indicated at line 3—3 on Fig. 2, and showing the automobile frame member also in section with a portion of the mud apron indicated in dotted outline.

The bumper for which this bracket is intended may be understood as of the same type as that shown in my co-pending application, Serial No. 194,216, filed October 1, 1917, in which the bumper bar extending transversely of the vehicle is connected to supporting bracket members by interposed spring members; it will be evident, however, that the utility of the present bracket is not necessarily limited to its association with an automobile bumper. But by reference to said co-pending application, it will be clear that the elements shown in dotted lines at A—A in Fig. 1 are the terminal portions of supporting springs by which the bracket member is attached to the bumper bar, and that these spring terminals, A—A, are secured to each bracket arm, 1, by means of bolts, 2, 2, inserted in the apertures of the bracket arm, 1. Fig. 2 shows in dotted outline a portion of an automobile frame member to which the present bracket is designed to be attached, and which, if shown in full line, would appear in front of the bracket as illustrated in Fig. 2, thus obscuring a considerable portion thereof. This frame member, B, is of channel section, and, in most automobiles is downwardly curved at the forward end of the vehicle, while it is desirable that the bracket arm, 1, extend substantially horizontally beyond the front end of the frame member, B. The arm, 1, of the bumper supporting member is therefore made oblique with respect to its flange, 3, so that said flange may extend under the frame member, B, while the arm, 1, projects horizontally therefrom.

For securing the bumper support to the frame member, B, a clamping bolt, 4, is provided, being carried in an elongated boss, 5, formed integral with the rear portion of the arm, 1, and extending partway under the frame member, B, as indicated in Fig. 3. A hook-nut, that is a nut having a hook projection, 6, is threaded for connection with the bolt, 4, and a spring washer, 7, is inserted under the head of the bolt to prevent it from coming unscrewed under vibration. The side of the bracket arm toward the frame member, B, is formed with a rib, 8, providing a bearing surface for contact with the web, B¹, of such member. The hook-nut, 6, is drawn by the clamping bolt, 4, into engagement with the flange, B², of the frame member, the broad tip, or terminal portion, 9, of the hook of the hook-nut, 6, bearing upon the upper surface of the flange, B², while the inclined surface, 10, of the slot or opening of said hook engages the lower edge of said flange, so that the tightening of the bolt, 4, tends to cause the edge of the flange, B², to climb up along the inclined surface, 10, insuring bearing of the hook terminal, 9, upon the upper face of the flange, B².

In applying the device to a vehicle frame, the hook nut, 6, will first be inserted between the mud apron, C, indicated in Fig. 3, and the frame member, B, engaging the lower flange, B², thereof; the bracket arm, 1, being then placed in position, the bolt, 4, will be inserted and screwed into the nut, 6, but left loose enough to permit adjustment of the arm, 1. Then by means of set screws, 11 and 12, bearing against the lower surface of said flange, B², of the frame member, the arm, 1, of the bracket may be adjusted to exactly horizontal position, or to any other angle desired. The bolt, 4, will then be tightened up, thus firmly gripping the web, B¹, and flange, B², between the bearing rib, 8, of the bracket arm and the hook-shaped nut, 6. Said nut may be closely fitted upon the threads of the bolt, 4, so that engagement of said bolt in the nut will secure the bolt in coaxial relation thereto, and the bolt, 4, in turn, may be closely fitted in the socket formed for it in the boss, 5, of the arm, without appreciable trans-axial play therein. Thus it will be clear that, even if the bolt, 4, should become slightly loosened, it will be impossible for the arm, 1, to drop away from the frame member, B, because any downward movement of the arm, 1, and boss, 5, with respect to the member, B, would involve a swinging of said parts about the point of engagement of the flange, B², with the inclined surface, 10, of the hook member, 6, as a fulcrum, and such movement would be checked by the stoppage of the terminal or tip, 9, upon the upper surface of the flange, B². Also, in the event of loosening of the bolt, 4, thus releasing the frictional engagement of the arm, 1, at its rib, 8, on the web, B¹, of the frame member, B, said arm, 1, would nevertheless be retained in substantially its adjusted position by the engagement of set screws, 11 and 12, against the under surface of flange, B², in coöperation with the engagement of the hook terminal, 9, against the upper surface of said flange, B², constituting a three-point bearing in substantially rigid relation with the arm, 1.

Obviously, if due care is employed in tightening up the bolt, 4, there will be little danger of its coming loose; but the above analysis will indicate that the bumper, even if loosened as suggested, will be carried safely by the supporting arms for a long time, while the limited rattle or vibration permitted by the loosened clamp would afford ample warning to the driver of the vehicle, so that he could stop and adjust the clamping bolt, 4, before any substantial damage was done. However, as a further precaution, where it is not objectionable to drill a hole in the web, B², of the frame member, B, an auxiliary attaching bolt, 13, may be applied as indicated in Figs. 2 and 3; but it should be understood that this bolt is supplemental to the clamping means already described, and that such clamping means are entirely adequate in themselves to secure and retain the parts in proper relation to the frame.

I claim:

1. In combination with a member of angular cross-section comprising a web and a flange, a second member and means for securing it to the first member including a clamping bolt carried by the second member and extending transversely beside the flange of the first, a portion of said second member being seated against the outer face of the web of the first member on the side thereof away from said flange; a bolt set through said second member against the outer face of the flange, and a device on said bolt formed to engage the inner face of the flange in opposition to said second mentioned bolt.

2. In a construction such as defined in claim 1, the device on the clamping bolt being a nut into which the bolt screws, having at one side a hook extending longitudinally beyond the inner end of the nut to overhang the inner face of the flange opposite the portion of the second member through which the bolt extends.

3. In combination with a member of angular cross-section comprising a web and a flange, a second member and means for securing it to the first member including a clamping bolt carried by the second member and extending transversely of the first member past the outer side of the flange, a portion of said second member being seated against the outer face of the web of the first member on the side away from the flange, a device on the clamping bolt having a hook which engages around the inner edge of the flange and has its end seating on the flange at a substantial distance back from the edge of the latter.

4. In a construction such as defined in claim 3 foregoing, a bolt set through said second member against the outer face of the flange in opposition to the seating end of the hook.

5. In a construction such as defined in claim 3 foregoing, two bolts set through the member against the outer face of the flange, spaced apart lengthwise of said first member at opposite sides of said clamping bolt; whereby the hook on the device on the clamping bolt bears against the inner surface of the flange opposite a point intermediate the position of said two bolts.

6. In a construction such as defined in claim 3 foregoing, the hook having at its bend a slope which encounters the lower corner of the flange edge and having clearance in the bend above the flange between the edge thereof and the point of bearing of the hook end on the surface of the flange; whereby the tightening of the bolt wedges the hook end against the inner face of the flange.

7. In a construction such as defined in claim 3 foregoing, a supplemental bolt which engages the second member with the web of the first member.

In testimony whereof, I have hereunto set my hand at Chicago, Illinois, this 5 day of November, 1917.

JOSEPH BERG.